Nov. 8, 1966  E. BUSCH  3,283,652
MODULAR MULTIPLE SCREEN FILM PROJECTION SYSTEMS
Filed Feb. 15, 1965  3 Sheets-Sheet 2

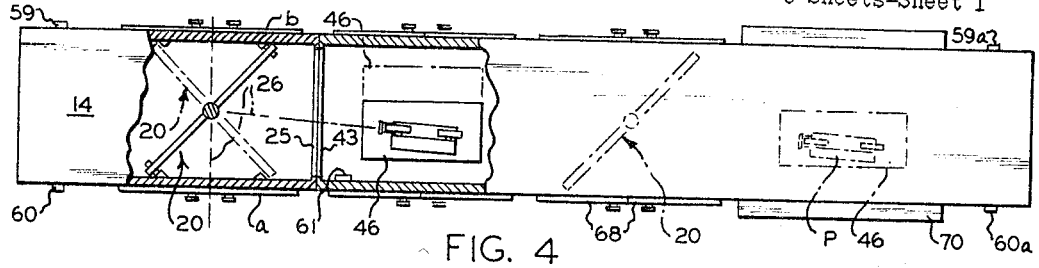
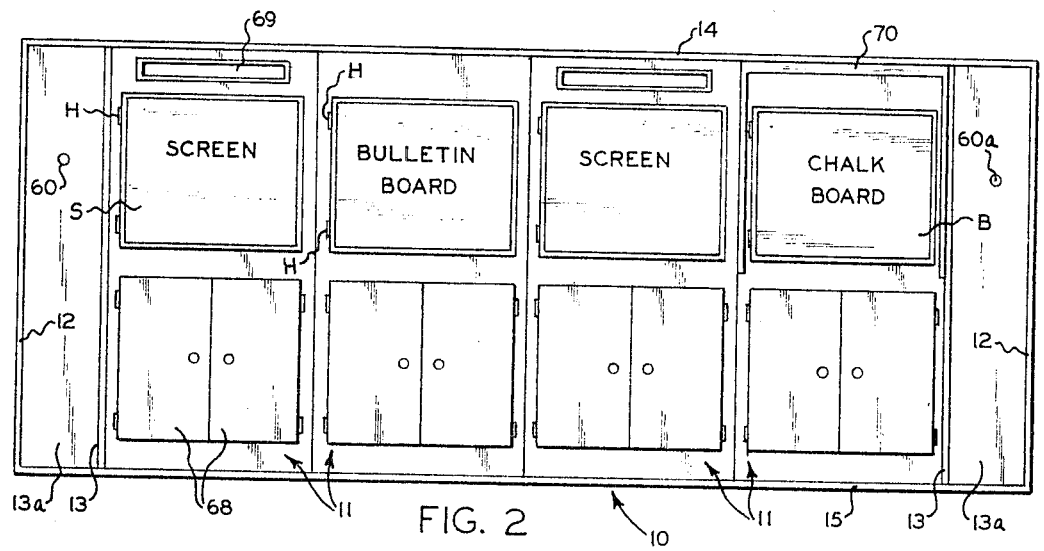
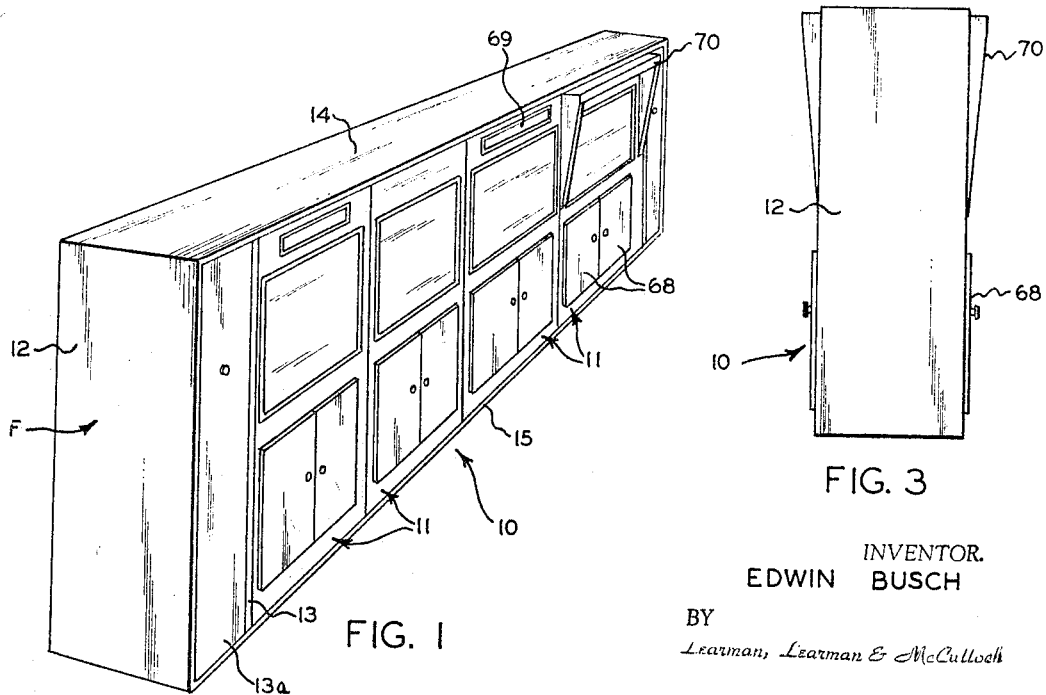

INVENTOR.
EDWIN BUSCH
BY

ATTORNEYS

Nov. 8, 1966  E. BUSCH  3,283,652
MODULAR MULTIPLE SCREEN FILM PROJECTION SYSTEMS
Filed Feb. 15, 1965  3 Sheets-Sheet 3

INVENTOR.
EDWIN BUSCH
BY
Learman, Learman & McCulloch
ATTORNEYS

United States Patent Office 3,283,652
Patented Nov. 8, 1966

3,283,652
MODULAR MULTIPLE SCREEN FILM
PROJECTION SYSTEMS
Edwin Busch, 1815 Seminole, Saginaw, Mich.
Filed Feb. 15, 1965, Ser. No. 432,505
14 Claims. (Cl. 88—24)

This invention relates to self-contained, multi-screen audio-visual communications systems formed of modular units. These units may be assembled to form a wall or room divider which can be utilized from either side. Such systems will be principally employed in schools to provide filmed lectures and demonstrations, but will also find many other uses, such as in expositions and sales demonstration and training classes, and for patient entertainment in hospitals and the like. In new building constructions these systems can be economically utilized to replace a conventional wall and they can be used as room dividers in new or existing buildings.

One of the prime objects of the invention is to provide a composite system having modular units with projection screens on both sides which selectively present a projected image on either side.

Another object of the invention is to provide a modular unit having universally adjustable projector supporting apparatus which permits selective operation in the manner described.

A further object of the invention is to provide a system with modular units which are easily accessible for changing the position of reflecting mirrors within the units and for changing film or projectors.

A still further object of the invention is to design projection units which, when assembled, will function as a wall or a room divider.

Another object of the invention is to design projection units that are extremely simple and economical to construct and install.

Other objects and advantages will become apparent when the following description is studied in conjunction with the drawings, in which:

FIGURE 1 is a perspective view of a wall section or room divider made up of modular units;

FIGURE 2 is a front elevational view of the wall section shown in FIGURE 1;

FIGURE 3 is an elevational view of the right end of the wall section shown in FIGURE 2;

FIGURE 4 is a partly sectional, top plan view of the above mentioned wall section;

Figure 6:
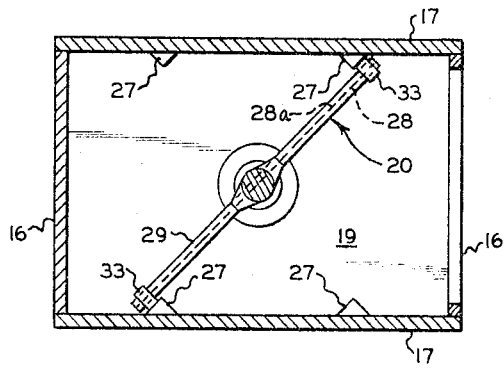
FIGURE 6 is a fragmentary, sectional top plan view taken on line 6—6 of FIGURE 5.

Referring now more particularly to the accompanying drawings, wherein I have shown presently preferred embodiments of my invention, a numeral 10 (FIGURES 1, 2, 3 and 4) generally indicates a typical wall section which includes modular cabinet units 11 accommodated in end-to-end abutting relation within a frame generally designated F. The frame F typically includes end walls 12, partition walls 13, and a top wall 14. In addition, baseboard strips 15 are usually employed on each side of frame F and side frame panels 13a are provided.

As shown particularly in FIGURE 2, alternate units 11 will be provided with translucent screens S in both sides and the other units 11 will mount boards B, such as bulletin and chalk boards, on both sides. While only one side of wall 10 is completely shown in the drawings, it is to be understood that they are identical. Each of the screens S and boards B is preferably supported on the side walls of the units 11 by concealed hinges at one end as at H (FIGURE 5) so that it can be swung outwardly and provide ready access to the interior of the units 11.

Figure 5:
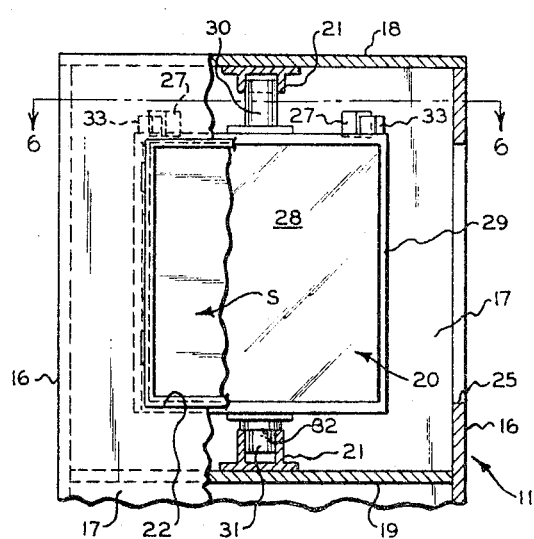
FIGURE 5 is a partly sectional, enlarged front elevational view of the upper portion of the screen-containing unit.
Figure 7:
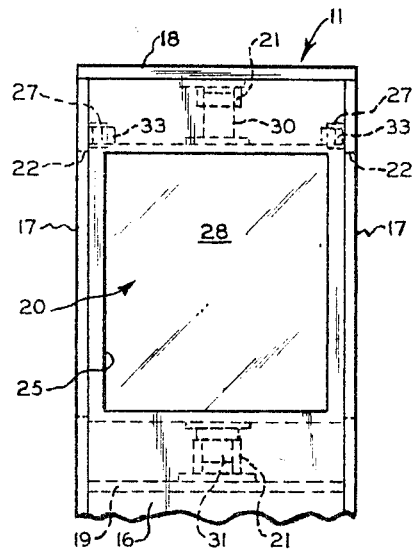
FIGURE 7 is an elevational view of the right end of the screen-containing unit shown in FIGURE 5.

Referring now particularly to FIGURE 5, each cabinet-like unit 11 mounting screens S comprises a box-like frame or cabinet which includes end members 16, side members 17, and a top member 18. Each of the units 11 mounting screens S further includes a horizontal support or shelf 19 mounting a mirror assembly generally designated 20 which is arranged to reflect an image from a projector P supported within one of the units 11 mounting a board B to one of the screens S on either side of a screen mounting unit 11. Bearings 21 which are secured to top 18 and shelf 19 journal each mirror assembly 20, and the side walls 17 of the screen mounting cabinet units 11 are provided with openings 22 over which the translucent but not transparent projection screens S are mounted. Provided in the end walls 16 of units 11 are openings 25 to permit the passage of projected images 26 from a projector unit P to a mirror assembly 20 (see FIGURE 4). Steel locating stops 27 are mounted on the side walls 17 of the units 11 which house the mirror assemblies 20 to properly position them in selective positions dependent on whether they are to reflect to one side or the other. Each mirror assembly 20 comprises back-to-back mirrors 28 and 28a secured in a frame 29 and secured to the top and bottom of each frame 29 are shafts 30 and 31 which are received in the bearings 21. The lower shaft 31 may be shouldered as at 32 to support each mirror assembly 20 with reduced frictional resistance. Magnets 33 are attached to the upper ends of frame 29 and function to hold each mirror assembly 20 against locating stops 27.

Figure 8:
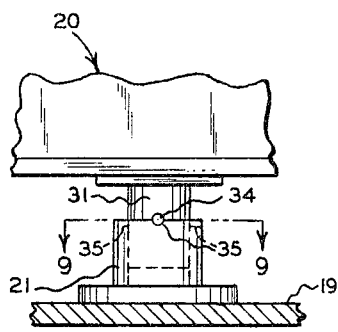
FIGURE 8 is a partly sectional, elevational view of another embodiment of the mirror support means.
Figure 9:
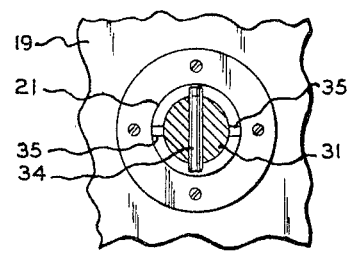
FIGURE 9 is a sectional top plan view taken on the line 9—9 of FIGURE 8.

An alternate manner of supporting and locating a mirror assembly 20 is shown in FIGURES 8 and 9. In this embodiment, shaft 31 is provided with a detention pin 34, and bearing 21 is provided with four equally spaced detention notches 35. The pin 34 extends beyond each side of shaft 31 and when it is engaged with notches 35 it will both locate and support the mirror assembly 20.

Figure 11:
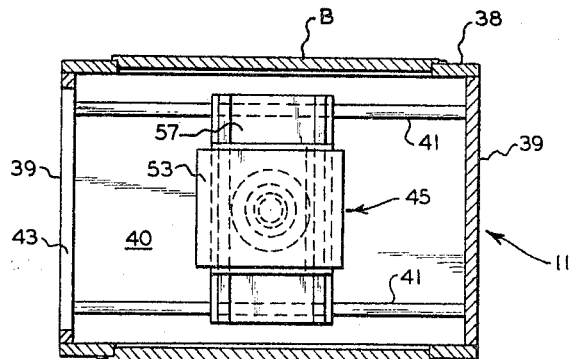
FIGURE 11 is a sectional top plan view of the projector unit, taken on the line 11—11 of FIGURE 10.
Figure 10:
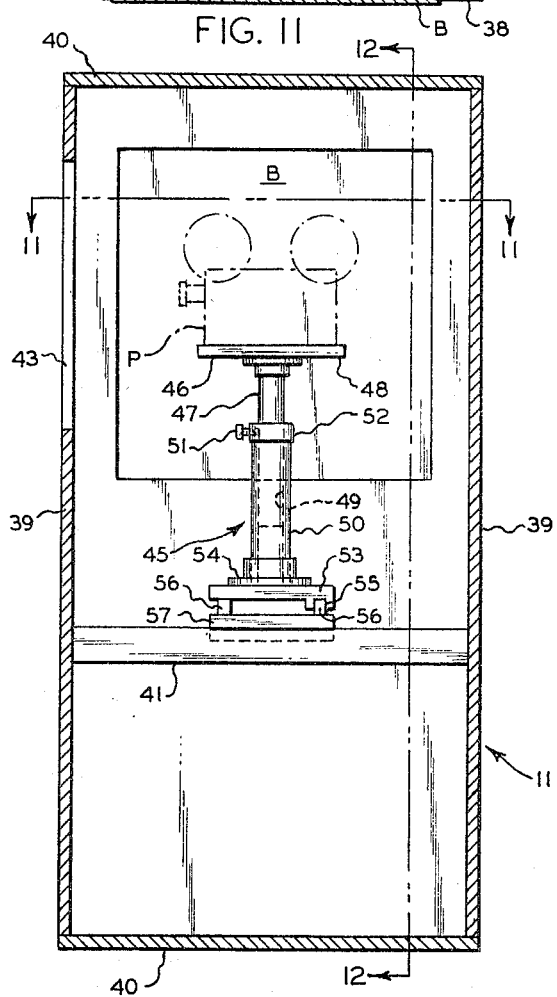
FIGURE 10 is a sectional, front elevational view of a projector-containing cabinet unit.
Figure 12:
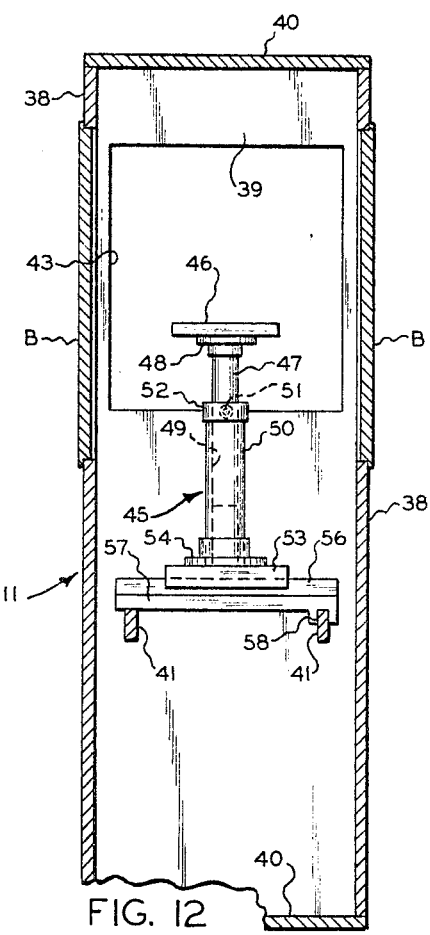
FIGURE 12 is a sectional elevational view of the right end of the projector unit, taken on the line 12—12 of FIGURE 10.

As shown in FIGURES 10, 11 and 12, the cabinet units 11 which are provided to house the projectors P comprise end walls 38, side walls 39, and top and bottom walls 40. Transversely disposed support rails 41 are provided in each projector housing cabinet 11 spanning the walls 39, and the walls 39 have openings 43 to permit passage of an image 26 from a projector P to a screen mounting unit 11. (See FIGURE 4.) The rails 41 each mount a projector support assembly generally designated 45, which includes a platform 46 fixed on a shaft 47 by bolts extending through the shaft flange 48. The shaft 47 is received in the bore 49 of a pedestal support sleeve 50 so that it is adjustable in a vertical and a rotational manner, and may be secured in particular positions by a lock screw 51 provided in a flange 52 of the support sleeve 50. The support sleeve 50 is secured to a longitudinal slide platform 53 by bolts extending through its flange 54, and the under surface of slide 53 is longitudinally grooved as at 55 to accommodate one of the guide ribs 56 on a transversely movable slide 57. Correspondingly, the under surface of slide 57 is grooved as at 58 to accommodate one of the support rails 41.

From the foregoing it will be clear that each projector P is movable transversely on the rails 41, longitudinally on the slide 57, and vertically with raising or lowering of the post 47, and it will soon become apparent that this movement is necessary to the selective projection of the image to one or the other screen S in a particular screen accommodating cabinet unit 11. In FIGURE 4 the mirror assemblies 20 are so positioned that the projectors P are projecting images which are reflected to the screens S shown in FIGURE 2 so that they may be viewed from the direction a. However, if the mirror assemblies 20 were shifted to the position shown in diagrammatic lines in FIGURE 4, the images would be reflected to the screens S on the opposite side of the wall 10 to permit the images to be viewed from the direction b.

Figure 13:
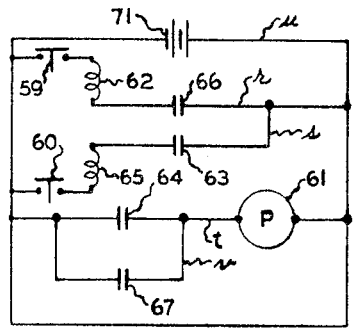
FIGURE 13 is a diagrammatic circuit diagram.

It is to be understood that the wall 10 will normally form a partition wall between classrooms, for instance, and where a particular projector P is in use by one class, I have provided mechanism as an integral part of the system which prevents a teacher in the other classroom from inadvertently interrupting its operation. In FIGURE 13 I have shown a circuit for controlling one of the projectors P and it is to be understood that the circuit for controlling the other projector P is identical. On each side of the wall 10 are push button switches 59 and 60 (see FIGURE 4) and these switches are similarly shown in FIGURE 13 in circuit lines r and s, which are wired in parallel. Another circuit line t includes the socket 61 preferably located inside each projector housing 11 into which the projector is plugged, and a line u connects to a source of power 62. Provided in circuit line r is a relay coil 62 which, when energized, opens normally closed contacts 63 in the circuit line s and closes normally open contacts 64 in circuit line t. The circuit line s includes a relay coil 65 which, when energized, opens normally closed contacts 66 in the circuit line r and closes normally open contacts 67 in the circuit line v which parallels the contacts 64. The operation of this circuitry will presently be described in detail.

In operation it will be assumed that the mirror assembly 20 in the left end cabinet unit 11 in FIGURES 2 and 4 is in the position in which it is shown in solid lines. Under these conditions the projector plattform 46 will be in the position in which it is shown in solid lines in FIGURE 4, offset centrally as shown. I have determined that this off-center positioning is necessary to avoidance of a "keystone" image projection in view of the fact that the width of the wall 10 is less than the longitudinal length of the screen S. If the teacher in the classroom facing the side of the wall unit 10 shown in FIGURE 2 wishes to use the projector P shown in solid lines, it is necessary merely to depress the push button 60, which closes contacts 67 and starts the projector motor 61. If the teacher on the opposite side of the wall 10 should now depresss switch 59, the operation of the projector will not be interrupted since energization of relay 65 has also opened the contacts 66.

In the event that the projector P shown in solid lines in FIGURE 4 is to be used to project to the screen S in the opposite wall of the partition 10, one of the screens S in the left end unit 11 in FIGURE 4 is swung outwardly on its hinges H and the mirror assembly 20 is moved to the position shown in diagrammatic lines, the magnetized stops 27 functioning to securely hold it in position. The position of the projector P will also need to be shifted to the diagrammaic line position shown in FIGURE 4 and this is accomplished by changing the position of the slide 57. While movie projectors have been shown for the sake of convenience, it is also contemplated that slide projectors will be used and in this event and when changing from one projector to another it may also be desirable to change the position of slide 53 and also the vertical position of platform 46, which can be accomplished by lowering the post 47 to a new position within the support sleeve 50. When the projector P is in operation on the remote side of the wall 10 (FIGURE 2), following depression of the push button 59, a teacher pressing button 60 similarly cannot interfere with the operation of the projector 60, because energization of relay 62 has opened the normally closed contacts 63.

The projector P and mirror assembly 20 shown in the two right end cabinet units 11 in FIGURES 2 and 4 are operated in exactly the same manner and the buttons 59 and 60 which control them may be placed in the wall 10 at 59a and 60a in the positions indicated. It is possible for the projector P shown in solid lines in FIGURE 4 to be turned end-for-end so that its image is played upon one side of the mirror assembly 20, shown in broken lines, at the same time projector P, shown in broken lines, plays upon its opposite side. When used in this manner, screens on each side of the wall 10 may be used simultaneously by both classrooms. For the sake of convenience, cabinet doors 68 may be provided in the lower portions of units 11 to open to storage shelves or the like, and speaker screens 69 may be provided in the units 11 which accommodate the mirror assemblies 20 to provide for sound projection. The members 70 are keystone eliminating members which may be used if it is desired to provide a roll-down screen above the chalk boards with some form of external projector.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:

1. In a film projection system; a partition wall comprising modular cabinet units in end-to-end abutting relation, at least one unit having translucent screens on opposite sides thereof, and an adjacent unit having projector support means therein; the adjacent ends of said units being open to admit the projector beam to the unit having the screens; and reflector means, within said unit having the screens, operable to reflect the beam to the interior surface of either screen and thereby to portray the image on the exterior surface of the screen.

2. In a film projection system; a wall comprising cabinet portions in end-to-end relation, at least one portion having translucent screens on opposite sides thereof, and an adjacent portion having projector support means therein; the adjacent ends of said portions being open to admit the projector beam to the portion having the screens; and reflector means, within said portion having the screens, operable to reflect the beam to the interior surface of either screen and thereby to portray the image on the exterior surface of the screen.

3. In a film projection system; a partition wall comprising modular cabinet units in end-to-end abutting relation, at least one unit having opposite translucent screens forming portions of the opposite sides thereof, and an adjacent unit having projector support means therein; means supporting the projector support means in different positions transversely of said wall, the adjacent ends of said units being open to admit the projector beam to the unit having the screens; and mirror means, within said unit having the screens, operable to reflect the beam to the interior surface of either screen and thereby to portray the image on the exterior surface of the screen.

4. The combination defined in claim 3 in which said means supporting the projector support means in different positions comprises transversely extending track means on which the support means is slideable.

5. The combination defined in claim 4 in which said means supporting the projector support means comprises a platform on a post vertically received in a support sleeve and movable vertically and rotatably to selective positions therein; the sleeve being mounted on a longitudinal slide movable on second longitudinal track means, and the second track means being mounted on a transverse slide movable on said track.

6. In a film projection system; a wall including modular cabinet means in end-to-end relation with alternating cabinet means having translucent screens on opposite sides thereof; reflector means in said alternating cabinet means movable for reflecting a projected image selectively to the interior surfaces of said screens on opposite sides and thereby to portray the image on the exterior surfaces of the screens; projector means in other cabinet means in alignment with said reflector means to project an image thereon; an electric circuit including a power source connection for said projector means to operate the same; multiple circuit making means in said circuit, mounted on opposite sides of said wall and operable for connecting the projector means with the power source; and means disabling one of said circuit making means when another circuit making means has been operated to power the projector means.

7. In a film projection system; wall means having translucent screens on different sides thereof; reflector means in said wall means operable for reflecting a projected image selectively to the interior surfaces of said screens and thereby to portray the image on the exterior surfaces of the screens; projector means in alignment with said reflector means to project an image thereon; an electric circuit including a power source connection for said projector means to operate the same; multiple circuit making means, including circuit making means for displaying an image on the screen on one side of said wall and circuit making means for displaying an image on the screen on the opposite side of the wall, in said circuit and operable for connecting the projector means with the power source; and means disabling one of said circuit making means when another circuit making means has been operated to power the projector means.

8. In a film projection system; cabinet means having translucent screens on opposite sides thereof; reflector means in said cabinet means movable for reflecting a projected image selectively to the interior surfaces of said screens and thereby to portray the image on the exterior surfaces of the screens; projector means in alignment with said reflector means to project an image thereon; an electric circuit including a power source connection for said projector means to operate the same; at least a pair of switches in said circuit mounted on the opposite sides of said wall and each operable for connecting the projector means with the power source; and means disabling one of said switches when the other switch has been operated to power the projector means.

9. The combination defined in claim 8 in which the switches are push buttons.

10. In a film projection system; a wall section formed by modular cabinet units in end-to-end relation with alternate units having translucent screens forming at least a portion of opposite sides thereof; reflector means in said cabinet units with screens movable for reflecting a projected image selectively to the interior surfaces of said screens and thereby to portray the image on the exterior surfaces of the screens; said reflector means being angularly disposed in said units with screens and having mirror surfaces on opposite sides thereof; projector means in each cabinet unit adjoining at least one unit with screens in alignment with said reflector means to project an image on opposite sides of said reflector means; an electric circuit including a power source connection for said projector means to operate the same; multiple circuit closing means in said circuit operable for connecting the projector means with the power source; and means disabling one of said circuit closing means when another circuit closing means has been operated to power the projector means.

11. In a film projection system; a partition wall comprising modular cabinet units in end-to-end abutting relation, at least one unit having translucent screens on opposite sides thereof, and adjacent units having projector support means therein; the adjacent ends of said units being open to admit projector beams to be admitted to the unit having the screens from both ends; and angularly disposed reflector means within said unit having the screens having mirror surfaces on each side to reflect the beam to the interior surface of each screen and thereby to portray the image on the exterior surfaces of the screens.

12. In a film projection system; a wall section formed by multiple, modular cabinet units in end-to-end relation; at least one cabinet unit mounting translucent screens in opposite sides thereof, and the cabinet units at either end thereof having projector support means therein at generally the same level; reflector means angularly disposed within said cabinet unit having mirror surfaces on opposite sides thereof for reflecting projected images to the interior surfaces of said translucent screens simultaneously and thereby to transfer the images to the exterior surfaces of said screens; and projector means on each of said support means, the ends of said cabinet units being open to admit the images projected therefrom to the cabinet unit having the reflector means.

13. In a film projection system; a wall section formed by cabinet means in end-to-end relation; at least one cabinet means mounting translucent screens in opposite sides thereof, and the cabinet means at either end thereof having projector support means therein; reflector means within said cabinet unit for reflecting different projected images to the interior surfaces of said translucent screens simultaneously and thereby to transfer the images to the exterior surfaces of said screen; and projector means on each of said support means, the ends of said cabinet units being open to admit the images projected therefrom to the cabinet unit having the reflector means.

14. In a film projection system; a wall section; at least one portion thereof mounting translucent screens in opposite sides thereof, and the portions at either end thereof having projector support means therein; reflector means within said wall section for reflecting different projected images to the interior surfaces of said translucent screens simultaneously and thereby to transfer the images to the exterior surfaces of said screens; and projectors on each of said support means.

References Cited by the Examiner
UNITED STATES PATENTS

| | | | |
|---|---|---|---|
| 1,954,786 | 4/1934 | Bright et al. | 88—24 |
| 2,022,902 | 12/1935 | Thomas | 88—24 |
| 2,022,903 | 12/1935 | Thomas | 88—24 |
| 2,225,012 | 12/1940 | Kallusch | 88—24 |
| 2,238,267 | 4/1941 | Katz | 88—24 |
| 2,351,618 | 6/1944 | Katz | 88—24 |
| 2,477,923 | 8/1949 | Fitt | 88—24 |
| 3,040,622 | 6/1962 | Reddle et al. | 352—104 |
| 3,051,040 | 8/1962 | Davis | 352—104 |
| 3,169,442 | 2/1965 | Reddle et al. | 88—24 |
| 3,174,394 | 3/1965 | Kapllow et al. | 88—24 |
| 3,185,027 | 5/1965 | Hodges et al. | 88—24 |
| 3,195,401 | 7/1965 | Lange | 88—24 |

NORTON ANSHER, JOHN M. HORAN,
*Primary Examiners.*

HAROLD F. FLANDERS, *Assistant Examiner.*